United States Patent [19]

Farley

[11] Patent Number: 5,430,901
[45] Date of Patent: Jul. 11, 1995

[54] ANATOMICALLY CONFORMABLE THERAPEUTIC MATTRESS OVERLAY

[76] Inventor: David L. Farley, 18672 Evergreen Ave., Yorba Linda, Calif. 92686

[21] Appl. No.: 74,743

[22] Filed: Jun. 10, 1993

[51] Int. Cl.⁶ .................. A61G 7/057; A47C 27/16; B32B 7/02; B32B 7/12
[52] U.S. Cl. .................................. 5/464; 5/466; 5/481; 5/903; 5/81.1; 156/304.1; 156/252; 156/253; 428/158
[58] Field of Search .............. 5/464, 481, 466, 474, 5/900.5, 901, 903, 81.1, 625; 156/304.1, 252, 253; 428/158

[56] References Cited

U.S. PATENT DOCUMENTS

| | | | |
|---|---|---|---|
| Re. 30,444 | 12/1980 | Spann | 128/80 |
| D. 174,812 | 5/1955 | Haller | D5/2 |
| D. 269,917 | 7/1983 | Spann | D32/51 |
| D. 287,641 | 1/1987 | Schaefer | D24/64 |
| D. 307,687 | 5/1990 | Raburn | D6/606 |
| D. 307,688 | 5/1990 | Schaefer | D6/606 |
| D. 311,108 | 10/1990 | Farley | D6/596 |
| D. 316,202 | 4/1991 | Farley | D6/596 |
| D. 322,907 | 1/1992 | Raburn | D6/596 |
| D. 326,204 | 5/1992 | Main | 5/901 |
| D. 326,976 | 6/1992 | Wickis, Jr. et al. | D6/601 |
| 988,117 | 3/1911 | Leonard . | |
| 1,334,901 | 3/1920 | Higdon | 5/81.1 |
| 1,978,041 | 10/1934 | Dodge | 18/59 |
| 2,357,513 | 9/1944 | Harmon | 20/69 |
| 2,705,211 | 3/1955 | Wyk, Jr. | 154/110 |
| 2,751,609 | 6/1956 | Oesterling et al. | 5/344 |
| 2,902,091 | 9/1959 | Dahle | 164/39 |
| 2,994,890 | 8/1961 | Wagner | 5/351 |
| 3,197,357 | 7/1965 | Schulpen | 161/116 |
| 3,243,828 | 4/1966 | McCarty | 5/338 |
| 3,311,007 | 3/1967 | McGee | 83/1 |
| 3,431,802 | 3/1969 | Schulpen | 83/4 |
| 3,553,068 | 1/1971 | Coale | 161/125 |
| 3,639,927 | 2/1972 | Munch | 5/91 |
| 3,674,618 | 7/1972 | Spann | 161/64 |
| 3,682,739 | 8/1972 | Tesch et al. . | |

(List continued on next page.)

FOREIGN PATENT DOCUMENTS

| | | | |
|---|---|---|---|
| 1015240 | 11/1981 | Germany | 5/434 |
| 5820953 | 12/1983 | Japan . | |
| 242467 | 12/1924 | United Kingdom . | |
| 687625 | 2/1953 | United Kingdom . | |
| 903336 | 8/1962 | United Kingdom . | |
| 1142494 | 2/1969 | United Kingdom . | |
| 1559851 | 1/1980 | United Kingdom | A47C 27/14 |
| 6007253 | 12/1986 | WIPO | 5/625 |

OTHER PUBLICATIONS

Biogard Critical Care "Floatation Unit", Bio Clinic Co., Flyer of 2 pages, Feb. 1985.
Geo-Matt, "The Cause of Pressure Ulcers May Not Be This Obvious", Span America, 1 page, 1990.
The Dermarest Therapeutic Comfort Mattress Program, Derma Care Systems, 2 pages, 1990.
"Prevent Pressure Sores". . . , Span America Medical Systems, Geo-Matt Brochure, 4 pages, 1986.
"Iris 10,000", Iris Floatation System Brochure, 8 pages, E. R. Carpenter Co., Inc., 1990.
Med+Foam Flyer, 1 page "How To Buy Quality Convoluted Foam Topper Pads"—no date.

Primary Examiner—Alexander Grosz
Attorney, Agent, or Firm—Stetina Brunda & Buyan

[57] ABSTRACT

A therapeutic mattress overlay for supporting a recumbent human body so as to redistribute body weight away from prominent areas of the human body and also to support selected anatomical body portions, e.g., the lower extremities, of the recumbent human body has a substantially planer resilient member having top and bottom surfaces and first and second edges. Reinforcements extend from proximate the first edge to proximate the second edge of the planer resilient mender such that a patient may be rotated by grasping the reinforcements proximate the first edge of the resilient member and lifting the first edge thereof so as to cause the patient to roll toward the second edge thereof. The reinforcements prevent damage to the resilient member during lifting of the first edge. The pad is formed to have at least one area of less resistance thereon which corresponds to protruding portion(s) of a human body.

19 Claims, 4 Drawing Sheets

U.S. PATENT DOCUMENTS

| | | | |
|---|---|---|---|
| 3,690,203 | 9/1972 | Huttemann | 83/1 |
| 3,695,128 | 10/1972 | Gentile | 83/1 |
| 3,730,031 | 5/1973 | Huttemann | 83/4 |
| 3,828,378 | 8/1974 | Flam | 5/464 |
| 3,903,878 | 9/1975 | Spann | 128/77 |
| 3,931,654 | 1/1976 | Spann | 5/327 |
| 3,938,205 | 2/1976 | Spann | 5/327 B |
| 3,939,829 | 2/1976 | Spann | 128/133 |
| 3,946,451 | 3/1976 | Spann | 5/327 R |
| 3,977,406 | 8/1976 | Roth | 128/296 |
| 4,042,987 | 8/1977 | Rogers | 5/345 R |
| 4,070,719 | 1/1978 | Morgan | 5/355 |
| 4,108,170 | 8/1978 | Spann | 128/134 |
| 4,110,881 | 9/1978 | Thompson | 5/481 |
| 4,135,504 | 1/1979 | Spann | 128/80 A |
| 4,185,813 | 1/1980 | Spann | 269/328 |
| 4,210,317 | 7/1980 | Spann et al. | 269/328 |
| 4,214,326 | 7/1980 | Spann | 5/431 |
| 4,233,700 | 11/1980 | Spann | 5/431 |
| 4,316,298 | 2/1982 | Russo et al. | 5/481 |
| 4,327,714 | 5/1982 | Spann | 128/80 A |
| 4,335,476 | 6/1982 | Watkin | 5/464 |
| 4,351,211 | 9/1982 | Azzolini | 83/861 |
| 4,392,489 | 7/1983 | Wagner, Sr. | 128/80 |
| 4,418,514 | 12/1983 | Spann | 53/436 |
| 4,422,194 | 12/1983 | Viesturs et al. | 5/451 |
| 4,433,678 | 2/1984 | Spann | 128/80 A |
| 4,471,952 | 9/1984 | Spann | 269/328 |
| 4,482,138 | 11/1984 | Spann | 269/328 |
| 4,522,447 | 6/1985 | Snyder et al. | 297/452 |
| 4,528,706 | 7/1985 | Branker | 5/465 |
| 4,550,547 | 11/1985 | Wagner, Sr. | 53/430 |
| 4,573,456 | 3/1986 | Spann | 128/80 R |
| 4,598,701 | 7/1986 | Schaefer | 128/87 C |
| 4,603,445 | 8/1986 | Spann | 5/481 |
| 4,620,337 | 11/1986 | Williams et al. | 5/464 |
| 4,672,700 | 6/1987 | Poncy | 5/441 |
| 4,673,452 | 6/1987 | Awdhan | 156/254 |
| 4,679,266 | 7/1987 | Kraft | 5/464 |
| 4,686,724 | 8/1987 | Bedford | 5/468 |
| 4,686,725 | 8/1987 | Mitchell | 5/481 |
| 4,700,447 | 10/1987 | Spann | 29/418 |
| 4,701,168 | 10/1987 | Gammons | 604/310 |
| 4,726,087 | 2/1988 | Schaefer et al. | 5/434 |
| 4,768,250 | 7/1988 | Kato | 5/453 |
| 4,768,251 | 9/1988 | Baskent | 5/464 |
| 4,768,253 | 10/1988 | Boyd | 5/464 |
| 4,832,007 | 5/1989 | Davis, Jr. et al. | 128/70 |
| 4,862,538 | 9/1989 | Spann et al. | 5/464 |
| 4,866,800 | 5/1989 | Bedford | 5/468 |
| 4,872,226 | 10/1989 | Lonardo | 5/81.1 |
| 4,879,776 | 11/1989 | Farley | 5/436 |
| 4,901,387 | 2/1990 | Luke | 5/464 |
| 4,955,096 | 9/1990 | Gilroy et al. | 5/464 |
| 4,972,535 | 11/1990 | Goldman | 5/464 |
| 4,999,868 | 3/1991 | Kraft | 5/464 |
| 5,007,124 | 4/1991 | Raburn et al. | 5/481 |
| 5,010,610 | 4/1991 | Ackley | 5/481 |
| 5,014,375 | 5/1991 | Coonrad et al. | 5/431 |
| 5,025,519 | 6/1991 | Spann et al. | 5/464 |
| 5,038,433 | 8/1991 | Farley | 5/464 |
| 5,077,849 | 1/1992 | Farley | 5/464 |
| 5,088,137 | 2/1992 | Rose | 5/625 |
| 5,111,542 | 5/1992 | Farley | 5/464 |
| 5,134,735 | 8/1992 | Rose | 5/464 |
| 5,172,439 | 12/1992 | Farley | 5/465 |
| 5,178,811 | 1/1993 | Farley | 264/138 |

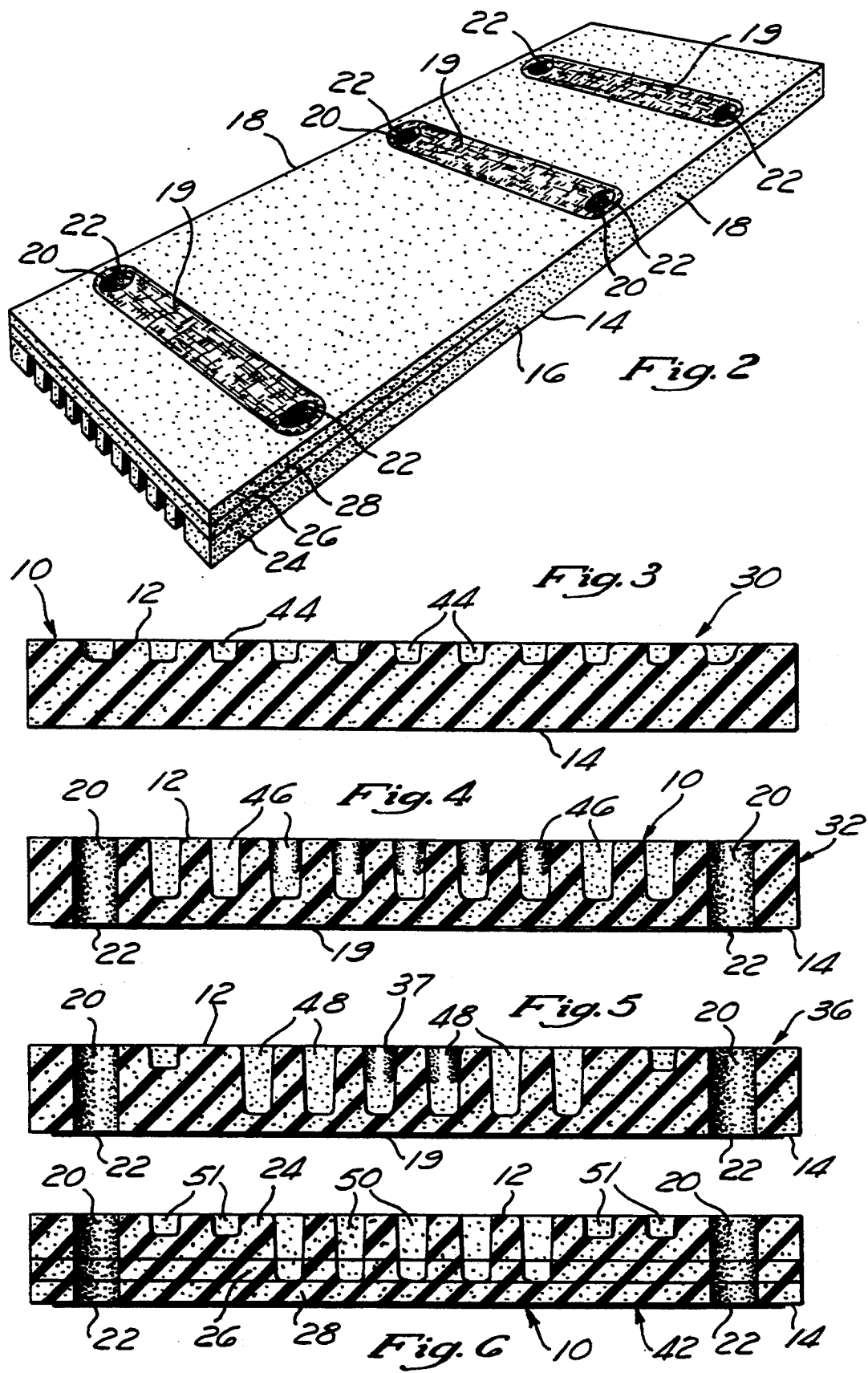

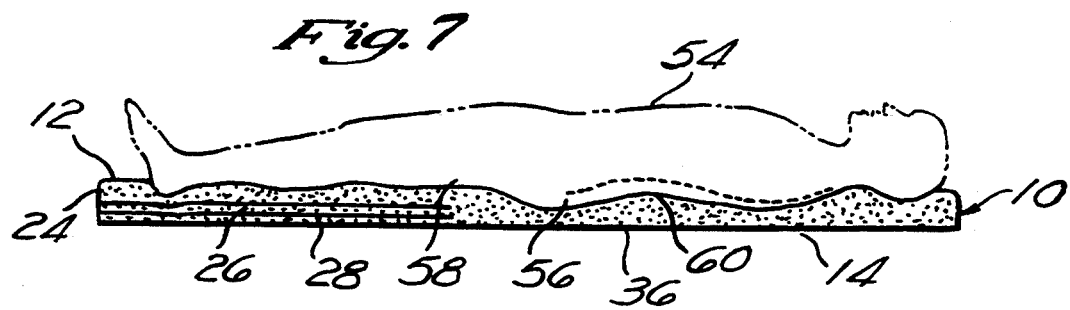
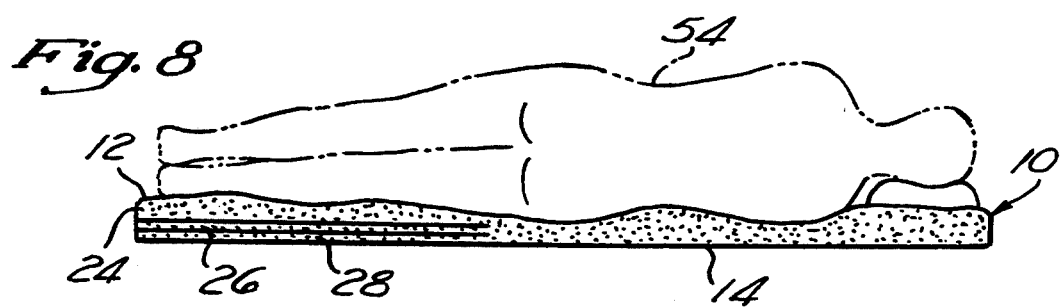
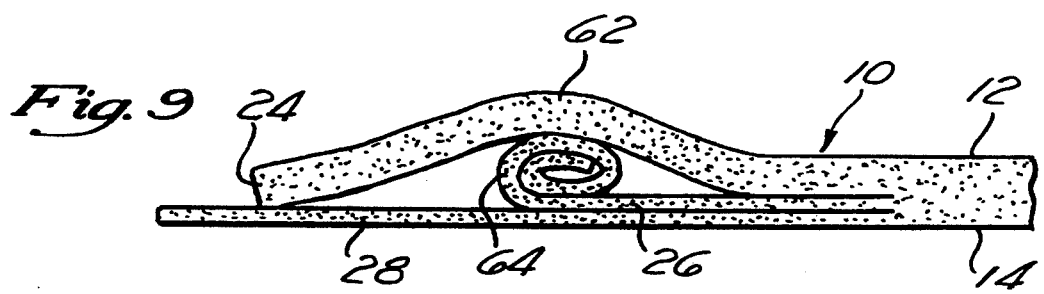
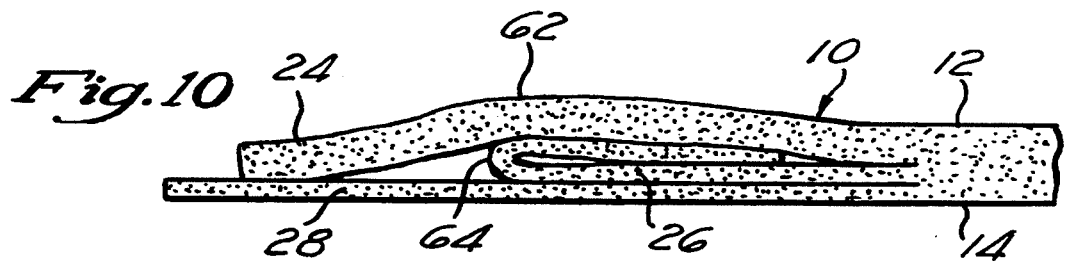
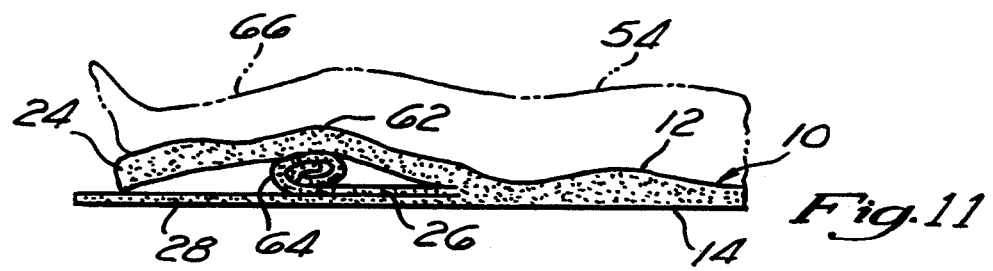

ANATOMICALLY CONFORMABLE THERAPEUTIC MATTRESS OVERLAY

FIELD OF THE INVENTION

The present invention relates generally to therapeutic support pads, and more particularly to an anatomically conformable therapeutic mattress overlay for supporting a recumbent human body. The therapeutic mattress overlay of the present invention redistributes body weight away from prominent areas of the human body, which areas are the most susceptible to the formation of pressure ulcers, and also supports selected anatomical body portions, e.g., the lower extremities, of a recumbent human body. Thus, weight is redistributed away from selected areas of the human body so as to prevent the formation of pressure ulcers thereon and so as to promote the healing of disorders due to trauma and/or pathological conditions.

BACKGROUND OF THE INVENTION

Two of the primary causes of pressure (decubitus) ulcers are pressure and moisture. Pressure results from the supporting surface resisting the force of gravity on the body. For mattresses, this pressure is typically the highest beneath the shoulder (the scapulae) and tail (the sacrum and trochanter); generally the areas of greatest mass and projection. Other areas subject to substantial pressure include the ankles, heel, and portions of the feet. In these high pressure areas, the pressure against the body can be sufficient to occlude the capillaries and lymph vessels, thereby preventing the circulation of oxygen and nutrients to the skin. In addition, because air flow over these skin areas is typically prevented due to the intimate contact of the surface of the mattress, greater amounts of moisture are excreted for the dissipation of heat and waste. Over a sufficient period of time, the combination of high pressure and moisture will lead to the formation of pressure ulcers.

In an effort to combat the formation of pressure ulcers among patients, hospitals utilize a number of types of bed pads for their patients who fall into high risk categories. These products include static air, water, and foam support pads. Although these pads cannot reduce the overall resistance of the mattress to the weight of the body, they can reduce the level of pressure on the areas of highest pressure by redistributing the load and allowing a greater portion of the pad to support the body. Each of these types of pads has different advantages and disadvantages.

Generally, static air and water support pads provide superior high pressure reduction capabilities at the bony prominence, but permit only limited air flow and heat dissipation. In addition, both static air and water support pads require filling, are susceptible to leaks, and tend to "bottom out" (i.e. permit the weight of the user to displace the air or water in the pad to the extent that the user is supported by the mattress, rather than by the air or water cushion). Static water support pads also are undesirable in that they are heavy and unwieldy to transport. While pumps and valves can be used to vary the pressure resistance of the static air and water pads over time, these features render the pad both expensive and difficult to install and transport.

Convoluted foam pads, on the other hand, are generally relatively inexpensive and easily transported, while providing superior air flow potential and moisture reduction capabilities. Unfortunately, despite considerable study and effort, it has proved exceedingly difficult to develop an easily manufactured convoluted foam pad which is capable of providing pressure reduction characteristics comparable to static air and water support pads.

The manufacture of convoluted foam pads continues to largely follow the methods taught by U.S. Pat. No. 3,431,802. The pads are typically formed by feeding a foam block between two cooperating parallel cylinders, each of which has an undulated surface. The cylinders rotate toward one another and are spaced so that a foam block inserted between them is compressed between the cylinders and is driven against a cutting edge which slices the block in half. Each half generally comprises alternating rows of peaks and valleys, in checkerboard fashion.

The resulting halves are perfectly matched so that when one half is laid upon the other, the tops of the peaks of one half rest against the floor of the valleys of the other half, thus forming a solid block. In addition, although it is possible to manufacture pads which are not the mirror image or reflection of one another, this is rarely done, as it would typically result in only one usable half, thereby significantly increasing material costs.

One convoluted foam pad currently in use is disclosed in U.S. Pat. No. 4,686,724. The pad comprises alternating columns of peaks and valleys in checkerboard fashion. Air channels are stamped, press cut, or laser cut through the floor of the valleys to the bottom face of the pad, leaving removable plugs used to selectively control the amount of aeration and dissipation of body heat permitted by the pad.

In one embodiment, the peaks of the pad are "topped off" to create a broken flat surface, interposed with valleys, with the distance between the floor of each valley and the bottom surface of the pad being constant. Within each valley is a channel extending from the valley floor to the flat bottom face of the pad. The patent teaches that a skin area of 1.25 inches in diameter or less, even though denied air circulation, can sustain itself from air circulating in an adjacent area. Therefore, by limiting each peak top to a diameter of 1.25 inches or less, the occurrence of pressure ulcers can, according to the patent, be virtually eliminated. Unfortunately, the use of this uniform pad with its removable plugs has found little acceptance in practice, perhaps because the removal and replacement of the individual plugs is relatively difficult and time consuming.

A second convoluted foam pad is disclosed in U.S. Pat. No. 4,620,337. The pad is designed to prevent the formation of decubitus ulcers by minimizing the amount of pressure exerted on the body. The pad has three distinct sections: a convoluted head supporting section; a ribbed torso supporting section; and a convoluted foot and leg supporting section. As with most foam pads which are manufactured from a block of uniform thickness, the sum of the distance from the bottom face of the pad to the top of any peak (the "peak height") and the distance from the bottom face of the pad to the floor of any valley (the "base height" or "valley floor height") remains constant. This arises from the fact that although the height of the undulating surface of the paired cylinders varies along their length, the opposing undulating surfaces are of an equal height.

The pad is designed on the premise that heavier portions of the body are less likely to develop pressure ulcers when they are supported by a portion of the pad with a lower peak to base ratio, and that lighter portions of the body are less likely to develop pressure ulcers when they are supported by a portion of the pad with a higher peak to base ratio. Accordingly, the ribs of the torso supporting section are shorter than the average height of the peaks of the head or leg supporting sections, and the floors of the valleys of the torso supporting section are higher than the average height of the floors of the valleys of the head or leg supporting sections. Unfortunately, however, the pressure reduction capabilities of this pad are significantly lower than the pressure reduction capabilities of static air or water support pads.

Disorders due to trauma and/or pathological conditions frequently require redistribution of weight away from the affected body part to facilitate healing thereof. The redistribution of weight is commonly accomplished by supporting surrounding areas with pillows and/or pads. For example, the treatment of an injury to the ankle may include supporting the patient's leg such that little or no weight is supported by the injured ankle.

However, such practice suffers from several deficiencies. The pillows and/or pads must be properly positioned to provide the required support and must remain so positioned for a length of time. Positioning a plurality of pillows and/or pads is not always a simple task and may involve the stacking of several layers in order to achieve the desired results. Once properly positioned, such pillows and/or pads are subject to being moved by the patient or others such that they no longer perform the desired function.

Additionally, the use of pillows and/or pads requires that a sufficient quantity of pillows and/or pads of the appropriate types be available when needed. It can often be a difficult and time-consuming task to locate suitable pillows and/or pads.

Furthermore, the use of pillows and/or pads to redistribute weight results in an area of increased pressure where the pillows and/or pads contact the patient, potentially resulting in the formation of pressure ulcers at the site of contact. For example, pillows placed under a calf to remove weight from an injured ankle undesirably increase the pressure upon the calf.

Additionally, it is frequently necessary to reposition and/or fluff any pillows used to support an anatomical body portion in order to obtain the optimum benefit therefrom. Pillows typically tend to become compacted or compressed during such use and thus lose a degree of their effectiveness. The compacted or compressed pillows both permit settling of the supported anatomical body portion, thus possibly allowing it to contact the mattress in an undesirable manner, and they also apply a greater amount of pressure to the supported anatomical portion than desired. Fluffing of the pillows necessarily requires that they be repositioned. Thus, the use of pillows to provide support to an anatomical body portion to facilitate healing of disorders due to an injury and/or pathological conditions requires the frequent attention of administering personnel.

As such, in view of the deficiencies of the prior art, it would be desirable to provide an anatomically conformable therapeutic mattress overlay for supporting a human body in a manner which redistributes body weight away from prominent areas of the human body and a means for supporting anatomical body portions suffering from disorders due to trauma and/or pathological conditions such that weight is redistributed away from the affected area wherein the supported anatomical body portion is not subject to an increased likelihood of incurring pressure ulcers.

SUMMARY OF THE INVENTION

The present invention specifically addresses and alleviates the above-mentioned deficiencies associated in the prior art. More particularly, the present invention comprises a therapeutic mattress overlay for supporting a recumbent human body so as to redistribute body weight away from bony prominent areas thereof and for supporting anatomical portions of a recumbent human body such that weight is redistributed away from areas suffering from disorders due to injury and/or pathological conditions to promote healing thereof.

In a first embodiment of the present invention, the therapeutic mattress overlay comprises a substantially planar resilient foam member, the substantially planer resilient pad or foam member having a top surface, a bottom surface, and first and second edges. Reinforcing means extend from proximate the first edge to proximate the second edge of the planer resilient member so as to facilitate rotating a patient by allowing a person to grasp the reinforcing means proximate the first edge of the resilient member and to lift the first edge thereof so as to cause the patient to roll toward the second edge thereof. The reinforcing means prevents damage to the resilient member during lifting of the first edge thereof.

The reinforcing means preferably comprises a fabric material disposed in laminar juxtaposition to the bottom surface of the resilient member. Cutouts formed through the resilient member and corresponding cutouts formed throughout the reinforcing means cooperate to define hand holds by which the first edge of the resilient member is graspable.

In order to accommodate the supporting of anatomical body portions, e.g., the lower extremities, of a recumbent human body, such that weight is redistributed away from desired areas so as to prevent the formation of pressure ulcers thereon, the planer resilient member comprises: a first layer; a separable second layer maintained generally in laminar juxtaposition to the first layer during use of the pad, the second layer also being foldable to provide an area of increased thickness to support the anatomical body portion; and a third layer disposed generally in laminar juxtaposition to the second layer and attached thereto.

The first, second, and third layers are preferably portions of a common piece of resilient material. The first layer is between approximately one and three inches thick, preferably approximately two inches thick. The second layer is between approximately ½ and two inches thick, preferably approximately one inch thick. The third layer is between approximately ⅜ and 1½ inches thick, preferably approximately ¾ inch thick.

Thus, the therapeutic mattress overlay comprises a first layer and a second layer disposed beneath the first layer and in laminar juxtaposition therewith such that the second layer may be configured to provide an area of increased thickness to support an anatomical body portion.

Convolutions formed in the first layer provide areas of less resistance to accommodate protruding portions of the human body.

The resilient member further comprises at least one area which provides less resistance to weight than other areas of the pad so as to support the recumbent human body in a manner which redistributes body weight away from bony prominent areas thereof.

The pad preferably comprises a resilient member having a head area; a scapula area, the scapula area being more resilient than the head area; a lumbar area, the lumbar area being more firm than the head area; a sacral area, the sacral area being more resilient than the head area; an upper thigh area, the upper thigh area being more firm than the head area; a lower thigh/calf area, the lower thigh/calf area being approximately as resilient as the head area; and a foot/ankle area, the foot/ankle area being more resilient than the head area.

In the preferred embodiment of the present invention, the head area comprises one inch deep valleys; the scapula area comprises three inch deep valleys; the lumbar area comprises no valleys; the sacral area comprises three inch deep valleys; the upper thigh area comprises no valleys; the lower thigh/calf area comprises one inch deep valleys; and the foot/ankle area comprises three inch deep valleys.

The scapular area preferably comprises peaks formed intermediate the valleys such that a first region is formed within the scapular area comprising webbing formed intermediate adjacent peaks and such that a second region is formed within the scapular area lacking webbing formed intermediate adjacent peaks. The second region is generally surrounded by the first region such that the firmness of the scapular area is reduced at its center.

The sacral area preferably comprises peaks formed intermediate the valleys such that a first region is formed within the sacral area having webbing formed intermediate adjacent peaks and such that a second region is formed within the sacral area lacking webbing formed intermediate adjacent peaks. The second region is again generally surrounded by the first region such that the firmness of the sacral area is reduced at its center, as with the scapular area.

The head area, scapular area, sacral area, lower thigh/calf and the foot/ankle area preferably comprise a plurality of peaks separated by valleys, such that each peak has a substantially flat top. The substantially flat tops of each peak are preferably configured so as to define a common plane.

Indicia may optionally be formed upon the first and/or second edges Of the resilient therapeutic mattress overlay so as to provide an indication of the preferred positioning of a patient thereon. Such indicia may optionally comprise an indication, i.e., a graph or curve, which is indicative of the resilience and/or firmness of the various sections of the mattress overlay. For example, a curve may be drawn upon the first and/or second edges of the mattress overlay wherein peaks of the curve indicate sections having greater firmness and valleys of the curve indicate sections having greater resiliency.

Thus, utilizing such indicia, a patient may be positioned upon the anatomically conformable therapeutic mattress overlay of the present invention in a manner which optimizes the therapeutic benefits derived therefrom.

A plastic slip cover may optionally be utilized to envelope the mattress overlay so as to provide a waterproof protective barrier to prevent soiling thereof. A plastic cover such as those plastic slip covers utilized with contemporary therapeutic mattress overlays is suitable. Those skilled in the art will recognize that various other means for isolating the therapeutic mattress overlay of the present invention so as to prevent soiling thereof are likewise suitable.

A comparatively firm region is preferably formed about the periphery of the therapeutic mattress overlay such that a patient disposed thereupon is maintained upon the therapeutic mattress overlay and the probability of the patient inadvertently rolling off of the therapeutic mattress overlay is mitigated. The comparatively firm region forms a barrier over which the patient must roll up hill, in order to roll off of the therapeutic mattress overlay. Additionally, the regions of comparative resiliency, i.e., the sacral and scapular regions help anchor the patient into the bed, thereby further mitigating the probability of the patient inadvertently rolling off of the therapeutic mattress overlay.

One example of a convoluted foam pad comprising peaks and valleys for supporting a recumbent patient upon a bed is disclosed in U.S. Pat. No. 5,010,609, issued on Apr. 30, 1991 to Farley, the contents of which are hereby incorporated by reference.

One example of a therapeutic mattress overlay for supporting anatomical portions of a recumbent patient such that weight is redistributed away from areas suffering from disorders due to injury and/or pathological conditions to promote healing thereof is disclosed in U.S. Pat. No. 5,172,439, issued on Dec. 22, 1992 to Farley, the contents of which are also hereby incorporated by reference.

In a second embodiment of the present invention, the therapeutic mattress overlay comprises a plurality of different sections of resilient material, i.e., foam, attached together, preferably via adhesive bonding, so as to define a plurality of regions of differing resiliency or firmness. Thus, regions of greater firmness may be formed at the head, lumbar, and upper thigh areas. Likewise, areas of greater resiliency may be formed at the scapular, sacral, lower thigh/calf, and foot/ankle regions.

Foam portions having greater firmness may optionally be disposed about the outboard edges or periphery of the therapeutic mattress overlay so as to prevent inadvertent rolling therefrom by a patient, as in the first embodiment thereof. The various sections of differing resiliency/firmness may comprise areas having different heights of peaks, areas having webbing interconnecting the peaks, areas lacking webbing interconnecting peaks, and areas of different types and/or densities of foam.

In the second embodiment of the anatomically conformable therapeutic mattress overlay of the present invention, the areas of varying resistance to weight are thus formed by attaching, via adhesive bonding for example, a plurality of separate pieces of foam material, having different densities and/or configurations, together.

For example, foam pieces having greater densities could be attached to adjacent foam pieces having lower densities such that the foam pieces having greater densities are positioned under those anatomical portions of the human body requiring greater firmness, i.e., lacking prominences, and those foam pieces having lower densities are positioned beneath those anatomical portions of the body requiring greater resiliency, i.e., having prominences.

The, sections or strips of high density foam optionally attached along the outer edges of the therapeutic mattress overlay provide a cradling effect wherein the patient tends to remain in the center portion of the mattress overlay since the outer portions or strips thereof are more firm and consequently must be rolled over, i.e., up hill, in order to roll off of the overlay.

Three separate layers may optionally be formed in the second embodiment of the present invention to facilitate supporting of anatomical body portions such that weight is redistributed away from desired areas as in the first embodiment of the present invention.

Thus, the present invention provides a means for supporting an anatomical body portion such that weight is removed from a desired area and such that the supported anatomical body portion is not subject to a substantially increased probability of the formation of pressure ulcers.

Use of the anatomically conformable therapeutic mattress overlay of the present invention results in a 50-75 percent reduction in rotation schedules of bed ridden patients. Thus, not only is the likelihood of incurring pressure ulcers reduced, but the effort required to provide proper care of such patients is also reduced.

The second embodiment of the present invention may optionally incorporate the reinforcing straps and cutouts of the first embodiment thereof, so as to facilitate turning of a patient by lifting one side of the mattress overlay without incurring damage thereto.

These, as well as other advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

FIG. 2 is a perspective view of the anatomically conformable therapeutic mattress overlay of the present invention, showing the lower surface thereof;

FIG. 3 is a cross sectional side view taken along lines 3 of FIG. 1;

FIG. 4 is a cross sectional side view taken along lines 4 of FIG. 1;

FIG. 5 is a cross sectional side view taken along lines 5 of FIG. 1;

FIG. 6 is a cross sectional side view taken along lines 6 of FIG. 1;

FIG. 7 illustrates a person laying on his back upon the anatomically conformable therapeutic mattress overlay of the present invention;

FIG. 8 illustrates a person laying on his side upon the anatomically conformable therapeutic mattress overlay of the present invention;

FIG. 9 illustrates rolling up of the second layer of the anatomically conformable therapeutic mattress overlay of the present invention so as to support a users foot and/or ankle;

FIG. 10 illustrates folding over of the second layer of the anatomically conformable therapeutic mattress overlay of the present invention so as to support a user's foot and/or ankle;

FIG. 11 illustrates use of the rolled up second layer of FIG. 9 to support a users foot and/or ankle.

DETAILED DESCRIPTION OF THE PREFERRED EMBODIMENT

The detailed description set forth below in connection with the amended drawings is intended as a description of the presently preferred embodiments of the invention, it is not intended to represent the only forms in which the present invention may be constructed or utilized. The description sets forth the functions and sequence of steps for constructing and operating the invention in connection with illustrated embodiments. It is to be understood, however, that the same or equivalent functions and sequences may be accomplished by different embodiments that are also intended to be encompassed within the spirit and scope of the invention.

Figure 1:
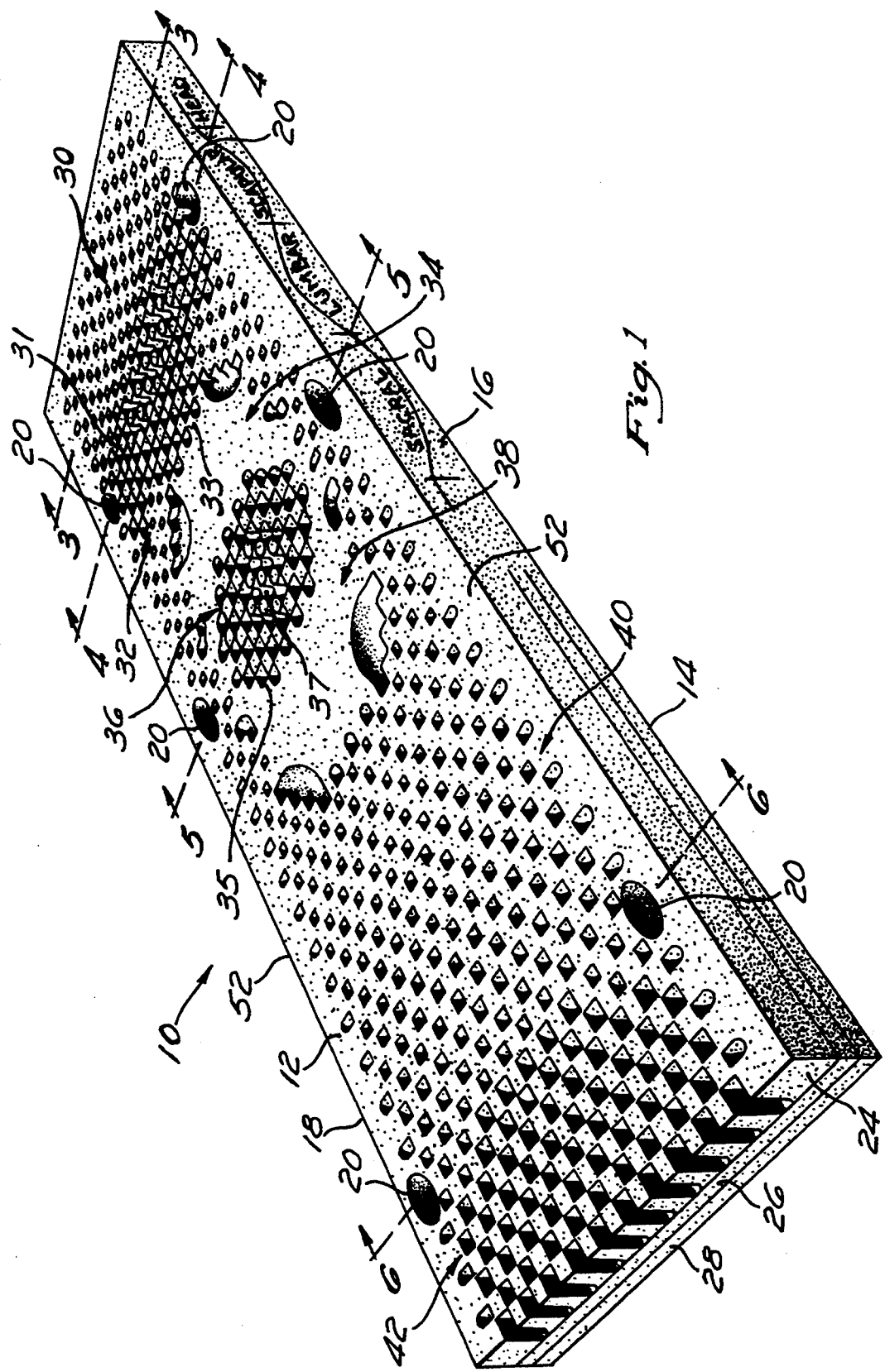
FIG. 1 is a perspective view of the anatomically conformable therapeutic mattress overlay of the present invention, showing the upper surface thereof.

The anatomically conformable therapeutic mattress overlay of the present invention is illustrated in FIGS. 1-12 which depict two presently preferred embodiments of the invention. Referring now to FIGS. 1 and 2, the first embodiment of the present invention is comprised generally of a substantially planar resilient member 10, having top 12 and bottom 14 surfaces.

The resilient member 10 is preferably comprised of polyurethane foam having a density of between one and three pounds per cubic foot. The resilient member is preferably approximately eighty inches long, approximately thirty-four inches wide, and approximately three inches thick.

With particular reference to FIG. 2, reinforcements 19 formed upon the resilient member 10 facilitate rotating a patient by allowing a person to grasp the reinforcements proximate a first edge 16 of the resilient member and to lift the first edge 16 thereof so as to cause the patient to roll toward a second edge 18 thereof. The reinforcements 19 preferably comprise a plurality of fabric straps extending along the bottom surface 14 of the resilient member 10 approximately from the first edge 16 of the resilient member 10 to approximately the second edge 18 thereof. The reinforcements 19 prevent damage to the resilient member 10 during the lifting of the first edge 16 thereof.

Cutouts 20 are formed through the resilient member 10 and correspond to cutouts 22 formed through the reinforcements 19. The cutouts 20 formed in the resilient member 10 cooperate with the cutouts 22 formed in the reinforcements 19 so as to define hand holds by which the first edge 16 (or alternatively, the second edge 18) of the resilient member 10 is graspable in order to facilitate rolling a patient disposed upon the anatomically conformable therapeutic mattress overlay of the present invention over.

In the preferred embodiment of the present invention, the resilient member 10 comprises a first layer 24, and a separable second layer 26 maintained generally in laminar juxtaposition to the first layer 24 during use of the anatomically conformable therapeutic mattress overlay of the present invention and being boldable so as to provide an area of increased thickness to support an anatomical body portion, i.e., the patient's foot, and/or ankle. A third layer 28 is disposed generally in laminar juxtaposition to the second layer and attached thereto.

The first, second, and third layers are preferably portions of a common piece of resilient material. Those skilled in the art will recognize that various means, i.e., cutting a single layer or adhesively bonding individual layers, are suitable for forming a resilient member, a portion of which is defined by three separate layers thereof.

The first layer is preferably between approximately one and three inches thick, the second layer is preferably between approximately ½ and two inches thick, and the third layer is preferably approximately between ½ and two inches thick. The first layer is preferably approximately two inches thick, the second layer is preferably approximately one inch thick, and the third layer is preferably approximately one inch thick.

The resilient member 10 preferably comprises at least one area which provides less resistance to weight than other areas thereof. The areas providing less resistance generally correspond to protruding portions of a human body.

In the preferred embodiment of the present invention, the resilient member comprises a head area 30; a scapular area 32, the scapular area being more resilient than the head area; a lumbar area 34, the lumbar 34 being more firm than the head area 30; a sacral area 36, the sacral area being more resilient than the head area 30; an upper thigh area 38, the upper thigh area 38 being more firm than the head area 30; a lower thigh/calf area 40, the lower thigh/calf area 40 being approximately as resilient as the head area 30; and a foot/ankle area 42, the foot/ankle area being more resilient than the head area 30.

Various portions of the resilient member 10 are formed to have peaks and valleys of various heights, so as to provide a desired amount of firmness or resiliency. A first region 31 is preferably formed within the scapular area wherein webbing is formed intermediate adjacent peaks so as to provide comparatively greater firmness than a second area 33 formed within the scapular area which lacks the webbing formed intermediate adjacent peaks. The second area 33 is disposed within and generally surrounded by the first area 31. The second area 33 is thus disposed within the scapular area 30 such that the bony prominences of a patient disposed upon the resilient member 10 correspond thereto.

Similarly, a first region 35 is formed within the sacral area 36 wherein webbing is formed intermediate adjacent peaks and a second area 37 is formed within the sacral area 36 and lacks the webbing formed intermediate adjacent peaks so as to correspond in position to the bony prominences of a patient's hip. The second area 37 is disposed within and is generally surrounded by the first area 35.

The head area 30, the scapular area 32, the sacral area 36, the lower thigh/calf area 40, and the foot/ankle area each comprise a plurality of peaks separated by valleys. Each peak preferably comprises a substantially flat top such that all of the substantially flat tops, taken together, define a common plane. The head area 30 preferably comprises one inch deep valleys, the scapular area 32 preferably comprises three inch deep valleys, the lumbar area preferably comprises no valleys, the sacral area preferably comprises three inch deep valleys, the upper thigh area preferably comprises no valleys, the lower thigh/calf area preferably comprises one inch deep valleys, and the foot/ankle area preferably comprises three inch deep valleys.

Referring now to FIG. 3, the valleys 44 forming the head area 30 are illustrated in cross section. Each of these valleys 44 has a nominal depth of approximately one inch. Those skilled in the art will recognize that various other depths of these valleys 44 are likewise suitable, depending upon the density, i.e., resiliency and firmness, of the resilient member 10.

Referring now to FIG. 4, the valleys 46 forming the scapular area 32 are illustrated in cross section. Each of these valleys 46 has a nominal depth of approximately three inches. Those skilled in the art will recognize that various other depths of these valleys 46 are likewise suitable, depending upon the density, i.e., resiliency and firmness, of the resilient member 10.

Referring now to FIG. 5, the valleys 48 forming the sacral area 36 are illustrated in cross section. Each of these valleys 48 has a nominal depth of approximately three inches. Those skilled in the art will recognize that various other depths of these valleys 48 are likewise suitable, depending upon the density, i.e., resiliency and firmness, of the resilient member 10.

Referring now to FIG. 6, the valleys 50 forming the lower thigh/calf area 40 and the valleys 51 of the foot/ankle area 42 are illustrated in cross section. Each of these valleys 50 of the lower thigh/calf area 40 has a nominal depth of approximately three inches and those of the foot/ankle area 42 have a nominal depth of one inch. Those skilled in the art will recognize that various other depths of these valleys 50 and 51 are likewise suitable, depending upon the density, i.e., resiliency and firmness, of the resilient member 10.

The anatomically conformable therapeutic mattress overlay of the present invention is preferably formed by first forming convoluted foam pads having the desired head 30, scapular 32, lumbar 34, sacral 36, upper thigh 38, lower thigh/calf 40, and foot/ankle 42 areas as described above, utilizing a process such as that described in U.S. Pat. No. 5,010,509. The reinforcements or fabric straps 19 are then attached to the lower surface 14 of the resilient member 10, preferably via adhesive bonding. Those skilled in the art will recognize that various other means, ultrasonic welding, sewing, etc., are likewise suitable for attaching the fabric straps 19 to the resilient member 10.

After the fabric straps 19 have been attached to the resilient member 10, the cutouts 20 formed in the resilient member 10 and the corresponding cutouts 22 formed in the fabric straps 19 are formed, preferably via die cutting. Those skilled in the art will recognize that various other methods for forming the cutouts 20 formed in the resilient member 10 and the cutouts 22 formed in the fabric straps 19 are likewise suitable and that either or both of the cutouts 20 and 22 may be formed prior to attachment of the fabric strap 19 to the resilient member 10, as desired.

The first 24, second 26, and third 28 layers may be cut into a single layer resilient member 10. Alternatively, three separate layers of foam material may be adhesively bonded or otherwise attached together so as to define a resilient member 10 having 3 sperate layers 24, 26, and 28, and preferably also having a single layer portion thereof.

The perimeter 52 of the upper surface 12 of the resilient member 10, particularly along the first 16, and second 18 edges thereof, defines a region of comparatively greater firmness such that patients, particularly the elderly, the very young, and the infirm, tend to remain generally centered upon the upper surface 12 of resilient member 10 which has areas of reduced firmness, i.e., the head area 30, the scapular area 32, the sacral area 36, the upper thigh/calf area 40, and the foot/ankle area 42. As such, a patient disposed upon the anatomically conformable therapeutic mattress overlay of the present invention sinks into and is cradled by the resilient member 10 and must exert substantial force in order to roll over the comparatively firm periphery 52 thereof. This substantially reduces the probability of a patient inadvertently rolling off of the anatomically conformable therapeutic mattress overlay of the present invention.

Having described the structure of the first embodiment of the anatomically conformable therapeutic mattress overlay of the present invention, a brief discussion of the use thereof may be beneficial. Referring now to FIGS. 7 and 8, a patient may lie upon the upper surface 12 of the resilient member 10 in such a manner that the patient's bony prominences sink deeper into the resilient member 10 than the remaining portions of the patient 54. For example, the hip area 56 sinks deeper into the resilient member 10, at the sacral area 36 thereof, than does the upper thigh 58 or the lumbar region 60 of the patient 54.

By allowing the bony prominences of the patient 54 to sink deeper into the resilient member 10 of the anatomically conformable therapeutic mattress overlay of the present invention, more uniform support is provided to the patient 54 throughout the interface of the patient 54 and the resilient member 10. This eliminates the high pressure contact areas known to cause pressure ulcers. Thus, the need to roll the patient over is mitigated, i.e., the time interval between such procedures is increased and the likelihood of the patient forming such pressure ulcers is mitigated.

The rolling over of the patient 54 is simplified by providing the hand holds defined by the cutouts 20 formed in the resilient member 10 and the corresponding cutouts 22 formed within the fabric straps 19. An attendant merely grasps the hand holds and lifts one edge, i.e., the first edge 18, of the resilient member 10 so as to cause the patient to roll toward the opposite edge, i.e, the second edge, thereof. Thus, the procedures for bedridden patients are substantially simplified by using the anatomically conformable therapeutic mattress overlay of the present invention.

Referring now to FIGS. 8–11, for those patients having an injury to one or both of the lower extremities, i.e., the foot, ankle, etc., pressure can further be reduced from the injured area by rolling (FIG. 9) the second layer 26 or folding (FIG. 10) the second layer 26 so as to form a raised portion 62 of the resilient member, which elevates the lower extremities and reduces the pressure applied by the foot, ankle, and lower leg, to the resilient member, thus facilitating healing of any injury thereof.

With particular reference to FIG. 11, the second layer 26 is rolled so as to form a support 64 which lifts the legs 66 of a patient 54 in a manner which reduces the pressure applied by the foot, ankle, and lower leg of the patient 54 to the resilient member 10.

Figure 12:
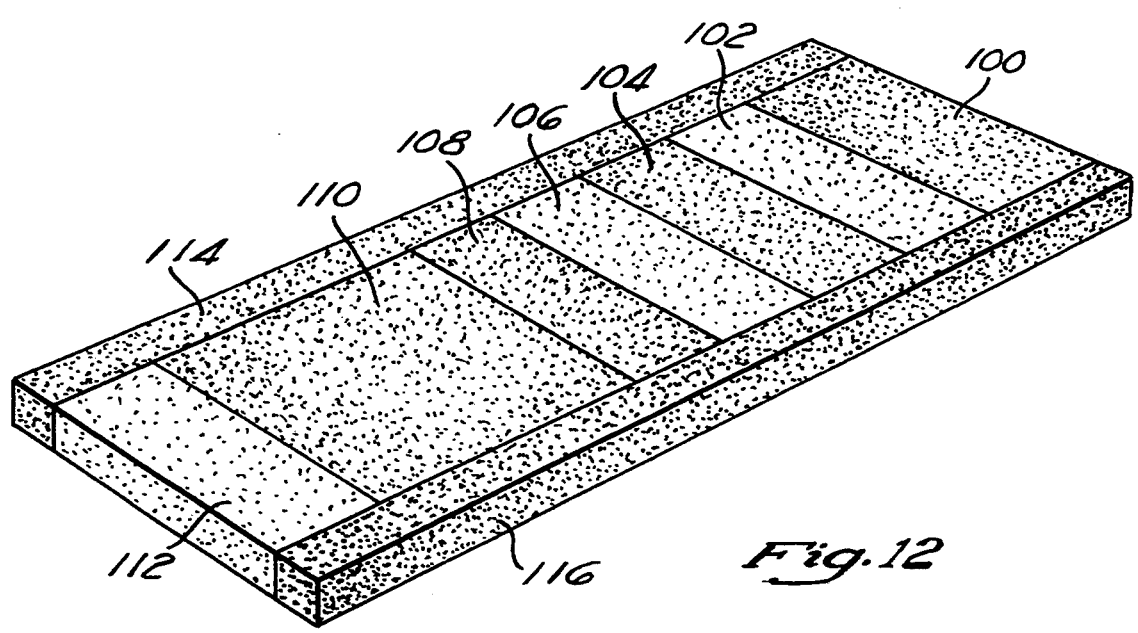
FIG. 12 is perspective view of a second embodiment of the anatomically conformable therapeutic mattress overlay of the present invention wherein separate pieces of foam material having different resiliencies/firmnesses are attached together.

Referring now to FIG. 12, in a second embodiment of the present invention, a plurality of separate pieces of foam material having different resiliencies or firmness are attached together, via adhesive bonding for example, so as to form an anatomically conformable therapeutic mattress overlay having a plurality of regions of differing firmness such that prominent areas of the body rest upon more resilient, i.e., less firm, regions thereof.

Variations in firmness or resiliency of the foam material may be provided by utilizing separate pieces of foam material having different densities and/or different configurations of convolutions formed thereon. Those skilled in the art will recognize that various other means for varying the firmness or resiliency of the separate foam pieces are likewise suitable.

In the second preferred embodiment of the present invention, the scapular area 102 is formed of a piece of foam material having more resiliency than the head portion 100. The lumbar region 104 is formed of a material more firm than the head material 100. The sacral region 106 is formed of a foam material more resilient than the head area 100. The upper thigh area 108 is formed of a foam material more firm than the head area 100. The lower thigh/calf area 110 is formed of a foam material approximately as resilient as the head area 100. The foot/ankle area 112 is formed of a foam material more resilient than the head area 100. Thus, the resiliency/firmness of the second embodiment of the anatomically conformable therapeutic mattress overlay of the present invention is analogous to that of the first embodiment thereof.

First 114 and second 116 rails with side members are attached to the sides of the head 100, scapular 102, lumbar 104, sacral 106, upper thigh 108, lower thigh/calf 110, and foot/ankle 112 regions so as to form a cradle, as in the first embodiment of the present invention. The first 114 and second 116 side members are formed of a foam material which is generally more firm than the head 100, scapular 102, lumbar 104, sacral 106, upper thigh 108, lower thigh/calf 110, and foot/ankle 112 regions. Thus, a patient laying upon the second embodiment of the anatomically conformable therapeutic mattress overlay of the present invention must roll up and over a more firm first 114 or second 116 side member in order to roll off of the therapeutic mattress overlay. Thus, as in the first embodiment of the present invention, the probability of a patient inadvertently rolling off of the anatomically conformable therapeutic mattress overlay of the present invention is substantially mitigated.

The second embodiment of the anatomically conformable therapeutic mattress overlay of the present invention is used in a manner which is analogous to that of the first embodiment thereof.

It is understood that the exemplary anatomically conformable therapeutic mattress overlay of the present invention described herein and shown in the drawings represents only a presently preferred embodiment of the invention. Indeed, various modifications and additions may be made to such embodiment without departing from the spirit and scope of the invention. For example, the size and/or configuration of the resilient member 10 may be varied, as desired, to accommodate various sizes and configurations of mattresses. Additionally, the first 24, second 26, and third 28 layers may be configured so as to support various other anatomical portions of the human body, i.e., the head, neck, arms, hands, etc. Additionally, those skilled in the art will recognized that various materials other than foam are suitable for use as the resilient member 10 and that various materials other than fabric are suitable for use as the strap 19. Thus, these and other modifications may be implemented to adapt the present invention for use in a variety of different applications.

What is claimed is:

1. A pad comprising:
   a) a substantially planar resilient member, said resilient member having top and bottom surfaces and first and second edges;
   b) reinforcements extending from proximate said first edge to proximate said second edge; and c) wherein said reinforcements facilitate rotating a patient by allowing a person to grasp the reinforcements proximate the first edge of said resilient member and to lift the first edge thereof so as to cause the patient to roll toward the second edge thereof, the reinforcing means preventing damage to the resilient member during lifting of the first edge thereof;

d) further comprising cutouts formed through said resilient member and corresponding cutouts formed through said reinforcements, said cutouts formed in said resilient member and said cutouts formed in said reinforcements cooperating to define hand holds by which the first edge of said resilient member is graspable.

2. The pad as recited in claim 1 wherein said resilient member is comprised of a foam material.

3. The pad as recited in claim 1 wherein said reinforcements are comprised of a fabric material.

4. The pad as recited in claim 1 wherein said reinforcements are comprised of a fabric material disposed in laminar juxtaposition to the bottom surface of said resilient member.

5. The pad as recited in claim 1 wherein said planar resilient member comprises:
   (a) a first layer;
   (b) a separable second layer maintained generally in laminar juxtaposition to said first layer during use of the pad, said second layer foldable to provide an area of increased thickness to support an anatomical body portion;
   (c) a third layer disposed generally in laminar juxtaposition to said second layer and attached thereto; and
   (d) wherein said first, second, and third layers are portions of a common piece of resilient material.

6. The pad as recited in claim 5 wherein:
   (a) said first layer is between approximately 1 and three inches thick;
   (b) said second layer is between approximately ½ and two inches thick;
   (c) said third layer is between approximately ½ and two inches thick.

7. The pad as recited in claim 5 wherein:
   (a) said first layer is approximately two inches thick;
   (b) said second layer is approximately one inch thick; and
   (c) said third layer is approximately one inch thick.

8. The pad as recited in claim 1 wherein said resilient member comprises:
   a) a head area;
   b) a scapular area, said scapular area being more resilient than said head area;
   c) a lumbar area, said lumbar area being more firm than said head area;
   d) a sacral area, said sacral area being more resilient than said head area;
   e) an upper thigh area, said upper thigh area being more firm than said head area;
   f) a lower thigh/calf area, said lower thigh/calf area being approximately as resilient as said head area; and
   g) a foot/ankle area, said foot/ankle area being more resilient than said head area.

9. The pad as recited in claim 8 wherein:
   a) said head area comprises one inch deep valleys;
   b) said scapular area comprises three inch deep valleys;
   c) said lumbar area comprises no valleys;
   d) said sacral area comprises three inch deep valleys;
   e) said upper thigh area comprises no valleys;
   f) said lower thigh/calf area comprises one inch deep valleys; and
   g) said foot/ankle are comprises three inch deep valleys.

10. The pad as recited in claim 8 wherein:
    a) said scapular area further comprises peaks formed intermediate said valleys;
    b) a first region formed within said scapular area comprises webbing formed intermediate adjacent peaks;
    c) a second region formed within said scapular area lacks webbing formed intermediate adjacent peaks;
    d) said sacral area further comprises peaks formed intermediate said valleys;
    e) a first region formed within said sacral area comprises webbing formed intermediate adjacent peaks; and
    f) a second region formed within said sacral area lacks webbing formed intermediate adjacent peaks.

11. The pad as recited in claim 8 wherein said head area, said scapular area, said sacral area, said lower thigh/calf area, and said foot/ankle area comprise a plurality of peaks separated by valleys, each peak having a substantially flat top.

12. The pad as recited in claim 11 wherein all of said substantially flat tops define a common plane.

13. A method for forming a pad, said method comprising the steps of:
    a) forming a substantially planar resilient member, said resilient member having top and bottom surfaces and first and second edges;
    b) attaching reinforcements to said resilient member, such that said reinforcements extend from proximate said first edge to proximate said second edge; and
    c) wherein said reinforcements facilitate rotating a patient by allowing a person to grasp the reinforcements proximate the first edge of said resilient member and to lift the first edge thereof so as to cause the patient to roll toward the second edge thereof, the reinforcements preventing damage to the resilient member during lifting of the first edge thereof;
    d) further comprising the step of forming cutouts through said resilient member and forming corresponding cutouts through said reinforcing means, said cutouts being formed in said resilient member and said cutouts being formed in said reinforcing means such that they cooperate to define hand holds by which the first edge of said resilient member is graspable.

14. The method as recited in claim 13 wherein the step of forming a substantially planar resilient member comprises forming a resilient member comprised of a foam material.

15. The method as recited in claim 13 wherein the step of attaching reinforcements to said resilient member comprises attaching reinforcements comprised of fabric material to said resilient member.

16. The method as recited in claim 15 wherein the step of attaching said reinforcements to said resilient member comprises adhesively bonding said reinforcements to said resilient member.

17. The method as recited in claim 13 wherein the step of attaching said reinforcement to said resilient member comprises attaching a resilient means comprised of a fabric material to the bottom surface of said resilient member.

18. The method as recited in claim 13 further comprising the step of forming first, second, and third layers in said resilient member, said first, second, and third layers being in laminar juxtaposition to one another such that a portion of said first, second, and third layers form a common single layer and such that a portion of said second layer is configurable to provide an area of increased thickness to support an anatomical body portion.

19. The method as recited in claim 18 further comprising the step of forming at least one area of less resistance in said first layer, said area(s) of less resistance corresponding to protruding portion(s) of a human body.

* * * * *